United States Patent
Gemassmer et al.

(10) Patent No.: US 12,289,067 B2
(45) Date of Patent: Apr. 29, 2025

(54) METHOD FOR OPERATING A DRIVE ARRANGEMENT

(71) Applicant: GKN AUTOMOTIVE LTD., Birmingham (GB)

(72) Inventors: Tobias Gemassmer, Bonn (DE); Tobias Egbers, Meppen (DE); Nico Maurin, Bornheim (DE)

(73) Assignee: GKN Automotive Limited, Birmingham (GB)

( * ) Notice: Subject to any disclaimer, the term of this patent is extended or adjusted under 35 U.S.C. 154(b) by 125 days.

(21) Appl. No.: 18/256,935

(22) PCT Filed: Dec. 16, 2020

(86) PCT No.: PCT/EP2020/086525
§ 371 (c)(1),
(2) Date: Jun. 12, 2023

(87) PCT Pub. No.: WO2022/128084
PCT Pub. Date: Jun. 23, 2022

(65) Prior Publication Data
US 2024/0039445 A1 Feb. 1, 2024

(51) Int. Cl.
*H02P 27/04* (2016.01)
*H02P 21/22* (2016.01)
(Continued)

(52) U.S. Cl.
CPC ............ *H02P 21/26* (2016.02); *H02P 21/22* (2016.02); *H02P 27/08* (2013.01)

(58) Field of Classification Search
CPC ........... H02P 21/26; H02P 21/22; H02P 27/08
(Continued)

(56) References Cited

U.S. PATENT DOCUMENTS

| 9,219,441 B2 | 12/2015 | Yasui et al. | |
| 2014/0312813 A1* | 10/2014 | Murchie | H02P 6/34 318/400.03 |

(Continued)

FOREIGN PATENT DOCUMENTS

| DE | 102010053098 A1 | 6/2012 |
| DE | 112018003079 T5 | 2/2020 |

(Continued)

OTHER PUBLICATIONS

JP Office Action for JP Application No. 2023-536403 dated Aug. 6, 2024 (7 pages).

(Continued)

*Primary Examiner* — Erick D Glass
(74) *Attorney, Agent, or Firm* — Reising Ethington P.C.

(57) ABSTRACT

A drive arrangement comprising an electric motor can be operated. The drive arrangement comprises the electric motor, an electrical circuit for operating the electric motor, and a control device for actuating the electrical circuit; wherein the electric motor has at least one stator comprising at least three coils and a rotor comprising at least two magnetic poles; wherein the electrical circuit has at least a first potential connection and a second potential connection, which can be connected to different potentials of a DC voltage source; wherein the electrical circuit comprises three half-bridges between the potential connections, wherein each coil is electrically conductively connected to each half-bridge via a respective first connection and to the other coils via a respective second connection.

14 Claims, 5 Drawing Sheets

(51) Int. Cl.
*H02P 21/26* (2016.01)
*H02P 27/08* (2006.01)

(58) Field of Classification Search
USPC .......................................................... 318/801
See application file for complete search history.

(56) References Cited

U.S. PATENT DOCUMENTS

| 2017/0250631 A1* | 8/2017 | Lamsahel | ................ H02P 6/16 |
| 2024/0240971 A1* | 7/2024 | Lechner | ................ H02P 25/022 |
| 2025/0033499 A1* | 1/2025 | Ge | ........................ B60L 58/27 |

FOREIGN PATENT DOCUMENTS

| DE | 102018127817 A1 | 5/2020 |
| DE | 112017007953 T5 | 7/2020 |
| EP | 3731408 A1 | 10/2020 |
| JP | 2014187864 A | 10/2014 |

OTHER PUBLICATIONS

International Search Report and Written Opinion for PCT/EP2020/086525 mailed Aug. 20, 2021 (10 pages; with English translation).

* cited by examiner

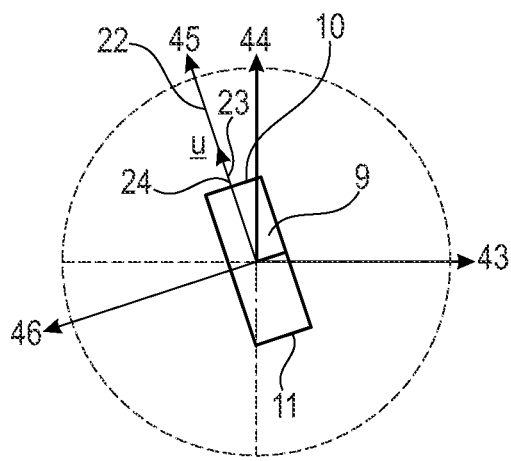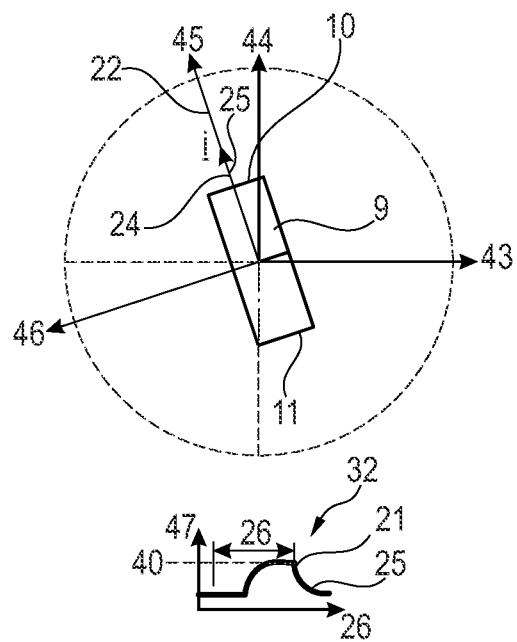
Fig. 3    Fig. 4
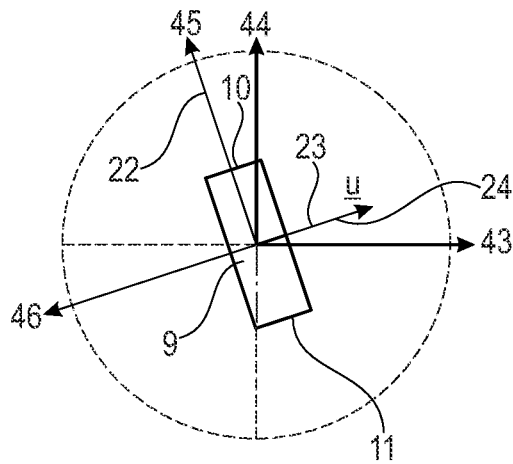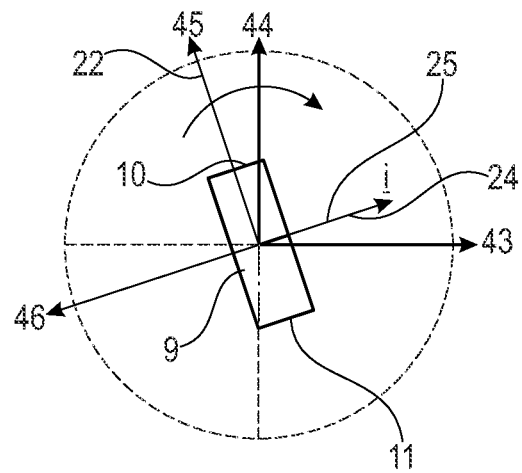
Fig. 5    Fig. 6

METHOD FOR OPERATING A DRIVE ARRANGEMENT

CROSS-REFERENCE TO RELATED APPLICATIONS

This application is a national stage of, and claims priority to, Patent Cooperation Treaty Application No. PCT/EP2020/086525, filed on Dec. 16, 2020, which application is hereby incorporated herein by reference in its entirety.

BACKGROUND

Electric motors are used, for example, as traction drives in motor vehicles. Among other things, a predetermined torque may be provided by the electric motor. It is desirable that correct operation is possible or that the motor can achieve intended results in operation.

DE 11 2017 007 953 T5 is directed to an anomaly diagnostic device for monitoring an electric motor. In that case, the current waveform or drive frequency of the electric motor is detected and evaluated by means of a frequency analysis.

DE 11 2018 003 079 T5 is directed to a rotary machine system diagnostic device. This is to diagnose the state of a rotary machine system. A current waveform and a drive frequency of a rotating electric motor during operation are detected for detecting short-circuit currents.

A method for diagnosing an electrical system is known from DE 10 2018 127 817 A1. A motor is short-circuited here during operation and the short-circuit currents are evaluated.

SUMMARY

The present disclosure includes a method for operating a drive arrangement. The drive arrangement comprises an electric motor, an electric circuit for operating the electric motor, and a control device for actuating the electric circuit. The electric motor comprises at least a stator and a rotor. A state of a drive arrangement can be detected and evaluated based on sensor technology used for the operation of the drive arrangement.

A method for operating a drive arrangement comprising an electric motor is proposed. The drive arrangement comprises at least the electric motor, an electric circuit for operating the electric motor, and a control device for actuating the electric circuit. The electric motor has at least a stator comprising at least three coils and a rotor comprising at least two magnetic poles. The electric circuit has at least a first potential terminal and a second potential terminal, which are connectable to different potentials of a DC voltage source. The electric circuit comprises three half-bridges between the potential terminals, wherein the coils are electrically conductively connected to one half-bridge each via a first terminal in each case and to the other coils via a second terminal in each case. The electric circuit has at least three current sensors for measuring an output current conducted via the corresponding first terminal.

The method comprises at least the following steps:
a) determining a rotational first position of the magnetic poles of the rotor with respect to the stator by the control device;
b) generating a voltage signal by the electric circuit, wherein the voltage signal has only a first phase position identical to the first position;
c) measuring current signals generated by the voltage signal through the current sensors;
d) evaluating the current signals by the control device and evaluating the state of the drive arrangement.

The above (non-exhaustive) classification of the method steps into a) to d) is primarily intended only for differentiation and does not enforce any order and/or dependency. The frequency of the method steps, for example during setup and/or operation of the drive arrangement, can also vary. It is likewise possible for method steps to at least partially overlap one another in terms of time. Method step d) can take place during step c) or even additionally during step b). Steps b) to d) can be conditional and, if necessary, can only be carried out if a determination of the first position is possible in step a) Similarly, each of steps c) and d) may also be conditional and, if necessary, executed only if, for example, measurement or evaluation of a current signal is possible Steps a) to d) can be carried out in the order indicated.

The electric motor comprises at least one stator and one rotor. The rotor is arranged rotatably relative to the stator. The rotor has permanent magnets so that the rotor can be driven by a rotating stator field. The electric motor can be designed in a known manner. The rotor can have at least two magnetic poles, but 2*n (with n=2, 3, 4, ...) magnetic poles can also be provided.

The electric circuit can be designed in a known manner and, for driving an electric motor, comprises a first potential terminal and a second potential terminal, which can be connected to different potentials (for example positive pole and ground) of a DC voltage source. Three half-bridges can be provided between the potential terminals, wherein the coils of the electric motor are electrically conductively connected to one half-bridge each via a first terminal in each case and to the other coils via a second terminal in each case. Several coils can also be connected to a first terminal.

The three half-bridges of the electric circuit enable the generation of a three-phase current system or multi-phase square currents, wherein the phases are offset from one another by 120 angular degrees. Each output current or phase current is transferred to a coil or provided in a coil via a first terminal in each case. The coils are connected to one another via second connections, wherein the different output or phase currents cancel one another out in the so-called star point, so that no separate or additional return conductor to the other potential terminal is required.

A half-bridge can comprise, in a known manner, an arrangement of an upper transistor and a lower transistor via which the potential terminals are connected to one another. A diode can be connected in parallel with each transistor.

Each half bridge can have at least one upper transistor (high-side transistor) and one lower transistor (low-side transistor) which are electrically conductively connected to one another. The upper transistor can be electrically conductively connected to the first potential terminal and the lower transistor can be electrically conductively connected to the second potential terminal. Each half-bridge can have, between the upper transistor and the lower transistor, the first terminal via which the corresponding coil is connected to the relevant half-bridge.

A corresponding output current can be generated via each half-bridge when a voltage signal is applied, and this output current is applied to the relevant coil of the electric motor via the corresponding first terminal. The output currents that can be generated in this way are detected in known electric circuits via current sensors, so that it is possible to control the electric motor during operation of the drive arrangement.

Compared with known drive arrangements, the proposed method may require only one control device suitably designed for carrying out the method. By way of the control device the method is initiated and the electric circuit for generating the voltage signal is operated.

Within the scope of step a), the control device can determine a rotational first position of the magnetic poles of the rotor relative to the stator. The first position can be determined in a known manner. For example, a position sensor of the electric motor can be evaluated.

Within the scope of step b), a voltage signal can be generated by the electric circuit, wherein the voltage signal has only a first phase position identical to the first position.

The phase angle (first phase position) of the voltage or of the voltage signal can be thus set so that it corresponds to the phase angle (first position) determined in step a).

Due to the voltage applied to the electric motor, the output current of the electric circuit will rise. The time response and the steady-state final value of the output current are determined here by the electrical time constant of the motor winding of the stator, i.e., by the resistance and the inductance. A torque is not generated here in the electric motor because the phase angle of the resulting output current corresponds to the first position of the magnetic poles, i.e., the phase angle of the permanent magnetic flux.

Within the scope of step c), current signals generated by the voltage signal (the output current at each first terminal) are measured by the current sensors.

The output current, or rather the output current generated across each half-bridge and flowing across each first terminal toward the coils, can be measured via the current sensors commonly present in the electric circuit.

The output current or the current signal can be measured over a time or a time interval or a test duration. This can is done until a constant value of the current signal or the current intensity is established or until a constant value can be determined (for example in case of asymptotic course of the rise of the current signal by calculation).

Within the scope of step d), the current signals are evaluated by the control device, for example at least with regard to a rise in the current signals over a period of time or over a test duration or with regard to a value of the current signal reached after a period of time. This rise or value of the current signals can be used to evaluate the state of the drive arrangement.

With the resistance and inductance of the motor winding or the electric motor, the relevant parameters of the electric motor are known—as explained above. These parameters are the basis for the behavior of the rise of the current signals or the current signal within the test duration.

A stationary final value of the current signal resulting from the voltage signal, i.e. the current intensity, can be determined or evaluated within the scope of steps c) and d). The current signal, which is formed, for example, by superimposing the current signals or output currents measured at each first terminal, can be compared with a previously defined value stored in the control device. If the deviations from this value are within a defined tolerance field, it can be assumed that the entire process chain consisting of the clocking transistors or half-bridges and their actuation, the connected motor and the measurement of the current signals via the current sensors is functional.

A rise in the current signal resulting from the voltage signal, i.e. the current intensity over time, can be determined or evaluated within the scope of steps c) and d). The current signal, which is formed, for example, by superimposing the current signals or output currents measured at each first terminal, can be compared with a predefined current signal stored in the control device or its curve, i.e., its rise.

If the output current or the current signal rises more slowly than stored in the control device, this can be an indication of an incorrectly applied voltage or an incorrectly measured position of the permanent magnet or the magnet poles, for example.

In permanently excited synchronous machines frequently used for traction drives, the electrical time constants parallel (d-axis) and perpendicular (q-axis) to the position of the permanent magnet usually differ significantly. In most cases, the time constant of the d-axis is smaller than that of the q-axis. This characteristic can also be taken into account in the evaluation according to step d).

With the proposed method, e.g., by means of motor monitoring realized exclusively in the form of software (i.e. compared to known drive arrangements without additional hardware), at least the course or the value of the current signal can be examined and, depending on the course or the value, a fault or an OK state of the drive arrangement can be detected as applicable.

If no error is detected during step d), the drive arrangement can be enabled for the intended operation so that, for example, a requested torque can be provided by the electric motor. In the event of a fault, for example, further operation of the electric motor can be prevented, so that a requested torque is no longer generated.

In step d) the current signals can be evaluated by the control device at least with regard to a rise in the current signals over time or with regard to a value of the current signal or the current intensity reached after a time or a time interval or a test duration. The current signal can be measured until a constant value of the current signal or the current intensity is established.

Each half-bridge can have at least one upper transistor and one lower transistor which are electrically conductively connected to one another; wherein the upper transistor is electrically conductively connected to the first potential terminal and the lower transistor is electrically conductively connected to the second potential terminal. In particular, each half-bridge has a contact point between the upper transistor and the lower transistor, via which contact points in each case the first terminal is connected to the corresponding half-bridge.

To generate the voltage signal according to step b), a pulse pattern can be selected in which all transistors clock. The voltage signal can be generated as a PWM signal (pulse-width-modulated signal) so that the voltage signal is composed of several individual signals.

If all transistors are clocked, the entire electric circuit can be checked within the scope of the method. The functionality of each individual transistor or half-bridge can be checked.

The voltage signal can have a constant voltage value. Here, "constant" means in particular that the voltage value deviates by at most 5%, possibly at most 2%, possibly at most 1%, from an average voltage value.

The rotor can have a constant first position at least during step a). In particular, a change in the position of the rotor is detected and evaluated during step d).

The rotor can be stationary with respect to the stator, i.e., has a speed of zero. If a change in the position of the rotor is detected during step b), i.e., if the rotor changes its first position or the phase angle due to the voltage signal and the current signal generated with it and provided on the electrical machine, a fault in the drive arrangement can be concluded.

The following faults of the drive arrangement can be detected and, if necessary, assigned:
- actual position of the rotor differs from the first position determined in step a);
- at least one transistor or half-bridge of the electric circuit does not clock;
- at least one current sensor is defective or measures the current signal incorrectly, so that the control by the control device cannot take place correctly;
- there is a defect in the electric motor, for example a short circuit at one of the terminals.

The rotor rotates relative to the stator at least during steps a), b) and c). During steps b) to d), no voltage signal may be generated by the electric circuit by which a torque is deliberately provided or generated, but instead only the voltage signal generated within the scope of the method (which, where possible, should not generate a torque) is provided.

Thus, no torque may be generated by the voltage signal provided within the scope of the method, since the voltage signal only has a first phase position identical to the first position of the magnetic poles. The correctness of the first position determined within the scope of step a) must be assumed.

Within the scope of step d), the establishing value of the current signal can be determined and compared with a value stored in the control device. If the deviations from this value are within a defined tolerance field, it can be assumed that the entire process chain consisting of the clocking transistors or half-bridges and their actuation, the connected motor, and the measurement of the current signals via the current sensors is functional.

The method is initiated when at least one of the following conditions exists:
- restart of the drive arrangement;
- rotor is stationary relative to the stator;
- rotor rotates torque-free relative to the stator.

If the current signals evaluated according to step d) are within a tolerance field with respect to a reference current signal stored in the control device, a release can be generated for operating the electric motor and for generating a torque. However, if the current signals are outside the tolerance field, an error message can be generated by the control device. In this case, the electric motor is not released for operation. The use of the electric motor to provide a torque is then prevented.

The tolerance field can comprise a deviation from a rise and/or a final value of a reference current signal stored in the control device. The deviation can be defined, for example, at specific times during the rise or during the measurement of the current signal or can be determined at all times. The deviation with respect to the reference current signal may be at most 5%, possibly at most 2%. The permissible deviation can be determined for the respective drive arrangement.

A drive arrangement is further proposed, at least comprising an electric motor, an electric circuit for operating the electric motor, and a control device for actuating the electric circuit. The drive arrangement or the control device is suitably designed and set up for carrying out the method described.

A drive train for a motor vehicle is further proposed, at least comprising the described drive arrangement, wherein the electric motor is a traction drive for providing a drive torque of the drive train.

The control device can be equipped, configured or programmed in such a way that the drive arrangement or the electric circuit can be operated in accordance with the described method.

The method can also be executed by a computer or with a processor of a control device.

A system for data processing is also proposed, comprising a processor adapted/configured to perform the method or part of the steps of the proposed method.

A computer-readable storage medium may be provided that comprises instructions that, when executed by a computer/processor, cause the computer/processor to carry out the method or at least some of the steps of the proposed method.

The comments regarding the method are transferable to the drive arrangement, the drive train or the computer-implemented method, and vice versa.

The use of indefinite articles ("a" and "an"), including in the claims and the description reproducing them, is to be understood as such and not as number words. Accordingly, terms or components introduced therewith are to be understood in such a way that they are present at least once and may also be present several times.

It should be noted by way of precaution that the number words used here ("first", "second", etc.) primarily serve (only) to distinguish between several similar objects, variables or processes, i.e., They do not necessarily specify any dependence and/or order of these objects, variables or processes with respect to one another. If a dependency and/or sequence is required, this is explicitly stated here or will be obvious to a person skilled in the art when studying the specifically described embodiment.

SUMMARY OF THE DRAWINGS

The disclosure and the technical environment will be explained in greater detail below with reference to the figures. It should be noted that the claimed invention is not intended to be limited by the exemplary embodiments shown. For example, unless explicitly presented otherwise, it is also possible to extract partial aspects of the facts explained in the figures and to combine them with other components and findings from the present description and/or figures. Identical reference signs denote identical objects, so that explanations from other figures can be used as a supplement if necessary. The figures show:

FIG. 3: steps a) and b) of the method with the drive arrangement in an OK state;

FIG. 4: steps c) and d) of the method with the drive arrangement in an OK state;

FIG. 5: steps a) and b) of the method in the event of a fault state of the drive arrangement;

FIG. 6: steps c) and d) of the method in the event of a fault state of the drive arrangement;

DESCRIPTION

Figure 1:
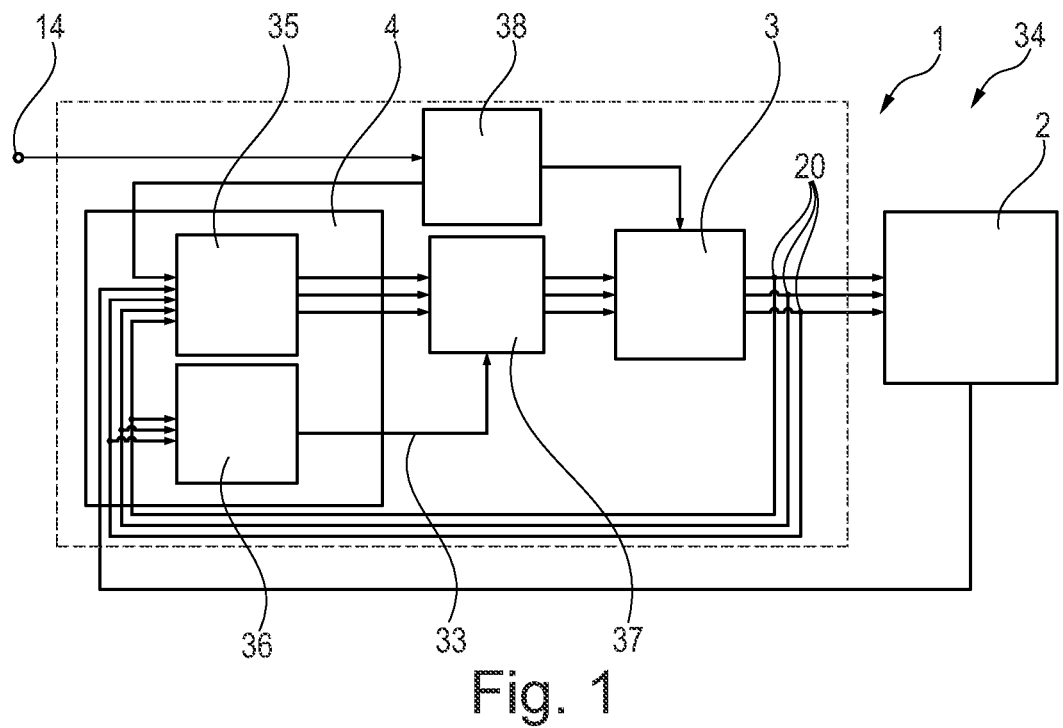
FIG. 1: a drive train of a motor vehicle with a drive arrangement.
Figure 2:
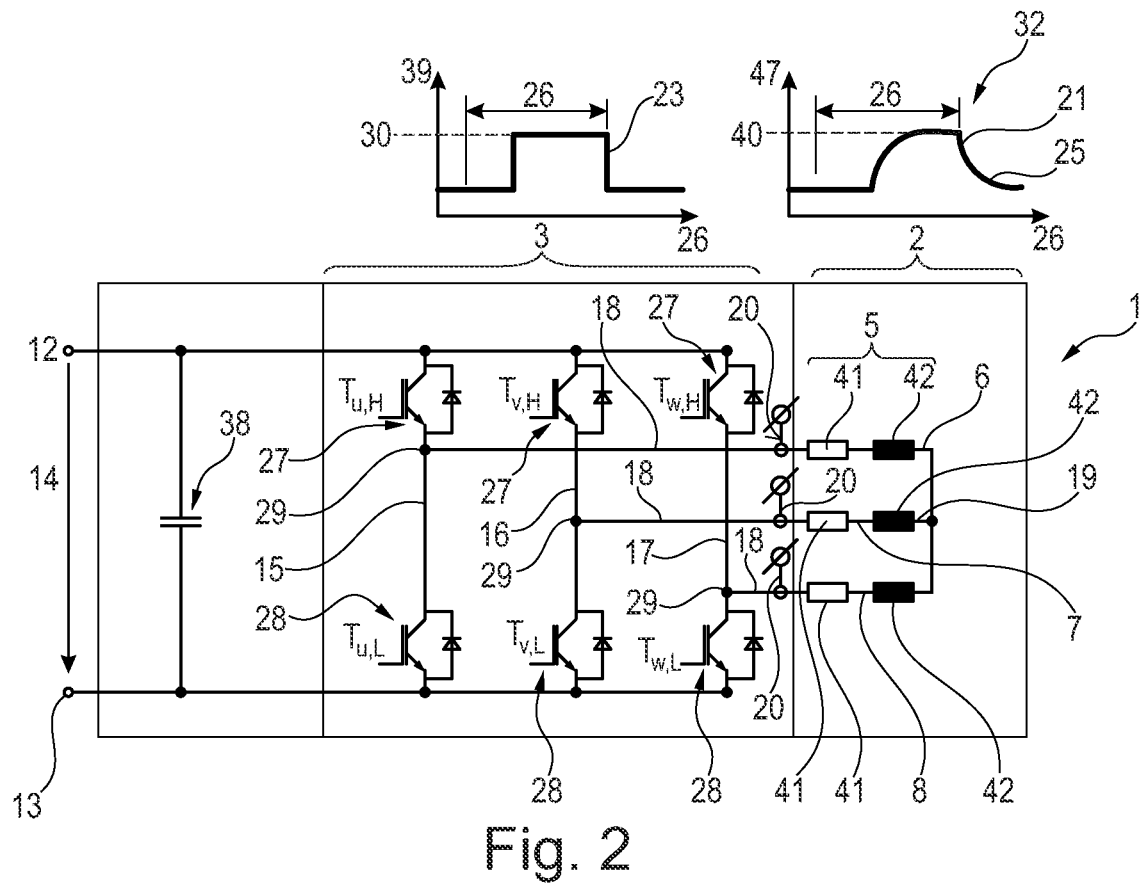
FIG. 2: part of the drive arrangement according to FIG. 1 and the operation of the method.

FIG. 1 shows a drive train 34 of a motor vehicle with a drive arrangement 1. FIG. 2 shows a part of the drive arrangement 1 according to FIG. 1 and the operation of the method. FIG. 3 shows steps a) and b) of the method with the drive arrangement 1 in an OK (or non-fault) state. FIG. 4 shows steps c) and d) of the method with the drive arrangement 1 in an OK state. FIGS. 1 to 4 are explained together below.

The drive arrangement 1 comprises an electric motor 2, an electric circuit 3 for operating the electric motor 2, and a control device 4 for actuating the electric circuit 3. The drive arrangement 1 or the control device 4 is suitably designed and equipped for carrying out the method described. The electric motor 2 is a traction drive for providing a drive torque of the drive train 34.

The control device 4 comprises a motor actuator 35 and a motor monitoring unit. The electric circuit 3 is connected to the motor actuator 35 and the motor monitoring unit via a safety logic unit 37. After detecting the state of the drive arrangement 1, the motor actuator 35 is able to actuate the electric circuit 3 and thus the electric motor 2. The motor monitoring unit 36 accesses some of the signals available to the motor actuator 35, thus revealing the faults of the measurement chain. The motor monitoring unit 36 is able to deactivate the actuation of the electric motor 2 by means of the safety logic unit 37 if a fault state of the drive arrangement 1 has been detected within the scope of the method.

The electric motor 2 has at least one stator 5 with at least three coils 6, 7, 8 and a rotor 9 with at least two magnetic poles 10, 11 (see FIGS. 3 to 6). The electric circuit 3 has a first potential terminal 12 and a second potential terminal 13, which can be connected to different potentials of a DC voltage source 14. A DC voltage capacitor 38 is arranged in parallel with the electric circuit 3.

The electric circuit 3 comprises three half-bridges 15, 16, 17 between the potential terminals 12, 13, wherein the coils 6, 7, 8 are electrically conductively connected to one half-bridge 15, 16, 17 each via a first terminal 18 in each case and to the other coils 6, 7, 8 via a second terminal 19 in each case. The electric circuit 3 has three current sensors 20 for measuring an output current 21 conducted via each first terminal 18.

In a known manner, a half-bridge 15, 16, 17 comprises an arrangement of an upper transistor 27 and a lower transistor 28, via which the potential terminals 12, 13 are connected to one another. In each half-bridge 15, 16, 17, an upper transistor 27 and a lower transistor 28 are electrically conductively connected to one another. The upper transistor 27 is electrically conductively connected to the first potential terminal 12 and the lower transistor 28 is electrically conductively connected to the second potential terminal 13. Each half-bridge 15, 16, 17 has, between the upper transistor 27 and the lower transistor 28, the corresponding first terminal 18 via which the corresponding coil 6, 7, 8 is connected to the relevant half-bridge 15, 16, 17. Each first terminal 18 is connected to the corresponding half-bridge 15, 16, 17 via a contact point 29.

Via each half-bridge 15, 16, 17, when a voltage signal 23 is applied, a corresponding output current 21 is generated, which is applied to the relevant coil 6, 7, 8 of the electric motor 2 via the corresponding first terminal 18. The output currents 21 that can be generated in this way are detected in the electric circuit 3 via current sensors 20, so that it is possible to control the electric motor 2 during operation of the drive arrangement 1.

Within the scope of step a), a rotational first position 22 of the magnetic poles 10, 11 of the rotor 9 relative to the stator 5 is determined by the control device 4 (see FIG. 3). The first position 22 can be determined in a known manner.

For example, a basically known position sensor (not shown here) of the electric motor 2 can be evaluated.

Within the scope of step b), a voltage signal 23 is generated by the electric circuit 3 (see FIG. 2, top-left diagram, and FIG. 3, bottom diagram; wherein voltage 39 is plotted on the vertical axis and time 26 is plotted on the horizontal axis). The voltage signal 23 has a first phase position 24 identical to the first position 22 (see FIG. 3, top diagram).

To generate the voltage signal 23 according to step b), a pulse pattern is selected in which all transistors 27, 28 clock. The voltage signal 23 is generated as a PWM signal (pulse-width-modulated signal), so that the voltage signal 23 is composed of several individual signals.

FIG. 3 (as well as FIGS. 4, 5 and 6) shows the stator-fixed coordinate system with the first axis 43 and the second axis 44, and the rotor-fixed coordinate system with the third axis 45 and the fourth axis 46. The third and fourth axes 45, 46 rotate with the magnetic poles 10, 11 with respect to the first and second axes 43, 44.

The phase angle (first phase position 24) of the voltage or voltage signal 23 is thus set so that it corresponds to the phase angle (first position 22) determined in step a) (see FIG. 3, above).

Due to the voltage 39 applied to the electric motor 2, the output current 21 of the electric circuit 3 will rise (see FIG. 4, bottom diagram, wherein the current 47 is plotted on the vertical axis and time 26 is plotted on the horizontal axis). The time response as well as the stationary final value 40 of the output current 21 are determined here by the electrical time constant of the motor winding of the stator 9, i.e. by the resistance 41 and the inductance 42. A torque is not generated here in the electric motor 2, since the phase angle of the resulting output current 21 corresponds to the first position 22 of the magnetic poles 10, 11, i.e., the phase angle of the permanent magnet flux (see FIG. 4).

Within the scope of step c), a measurement of current signals 25 (of the output current 21 at each first terminal 18) generated by the voltage signal 23 is performed by the current sensors 20.

The output current 21, or the output current 21 generated across each half-bridge 15, 16, 17 and flowing across each first terminal 18 towards the coils 6, 7, 8, is measured via the current sensors 20 usually present in the electric circuit 3. The output current 21 or of the current signal 25 (of the entirety of the current signals 25) is measured over a time 26 or a time interval or a test duration until a constant (final) value 40 of the current signal 25 or of the current intensity is established or until a constant value can be determined (for example by calculation in the case of an asymptotic course of the rise of the current signal 25).

Within the scope of step d), the current signals 25 are evaluated by the control device 4, for example at least with regard to a rise in the current signals 25 over a time 26 or over a test duration or with regard to a final value 40 of the current signal 25 reached after a time. This rise or final value 40 of the current signals 25 is used to evaluate the state of the drive arrangement 1.

With the resistance 41 and the inductance 42 of the motor winding or the electric motor 2, the relevant parameters of the electric motor 2 are known. These parameters are the basis for the behavior of the rise of the current signals 25 or the current signal 25 within the test duration.

Thus, within the scope of steps c) and d), a stationary final value 40 of the current signal 25 resulting from the voltage signal 23, i.e. the current intensity, can be determined or evaluated. The current signal 25, which is formed, for example, by superimposing the current signals 25 or output currents 21 measured at each first terminal 18, can be compared with a previously defined value stored in the control device 4. If the deviations from this value are within a defined tolerance field 31, it can be assumed that the entire process chain, consisting of the clocking transistors 27, 28 or half-bridges 15, 16, 17 and their actuation, the connected motor 2 and the measurement of the current signals 25 via the current sensors 20, is functional.

With the proposed method, motor monitoring realized exclusively in the form of software (i.e., compared to known drive arrangements 1 without additional hardware) can be used to examine at least the course or the (final) value 40 of the current signal 25 and, depending on the course or the (final) value 40, to identify a fault or an OK state of the drive arrangement 1.

If no error is identified within the scope of step d), the drive arrangement 1 can be released for the intended operation so that, for example, a requested torque can be provided by the electric motor 2. In the event of a fault, for example, further operation of the electric motor 2 can be prevented, so that a requested torque is no longer generated.

FIG. 5 shows steps a) and b) of the method when the drive arrangement 1 is in a fault state. FIG. 6 shows steps c) and d) of the method when the drive arrangement 1 is in a fault state. FIGS. 5 and 6 are described together below. Reference is made to the explanations for FIGS. 1 to 4.

In FIG. 5 it can be seen that the phase angle (first phase position 24) of the voltage or of the voltage signal 23 deviates from the first position 22. The determination of the rotational first position 22 of the magnetic poles 10, 11 of the rotor 9 relative to the stator 5 by the control device 3, which was carried out in the context of step a), thus generates an error here, for example.

If a change in the position of the rotor is detected during step b), i.e. if the rotor changes its first position or phase angle as a result of the voltage signal and the current signal generated thereby and provided on the electrical machine, a fault in the drive arrangement can be concluded.

Within the scope of step c), a measurement of current signals 25 (of the output current 21 at each first terminal 18) generated by the voltage signal 23 is performed by the current sensors 20.

Within the scope of step d), the current signals 25 are evaluated by the control device 4, for example at least with regard to a rise in the current signals 25 over a time 26 or over a test duration or with regard to a final value 40 of the current signal 25 reached after a time. This rise or final value 40 of the current signals 25 is used to evaluate the state of the drive arrangement 1.

Here, it can be seen that the output current 21 or the current signal 25 rises more slowly than stored in the control device 4. As already explained, this may be an indication of an incorrectly applied voltage 39 or an incorrectly generated voltage signal 23 or an incorrectly measured first 22 position of the permanent magnets or of the magnetic poles 10, 11.

Figure 7:
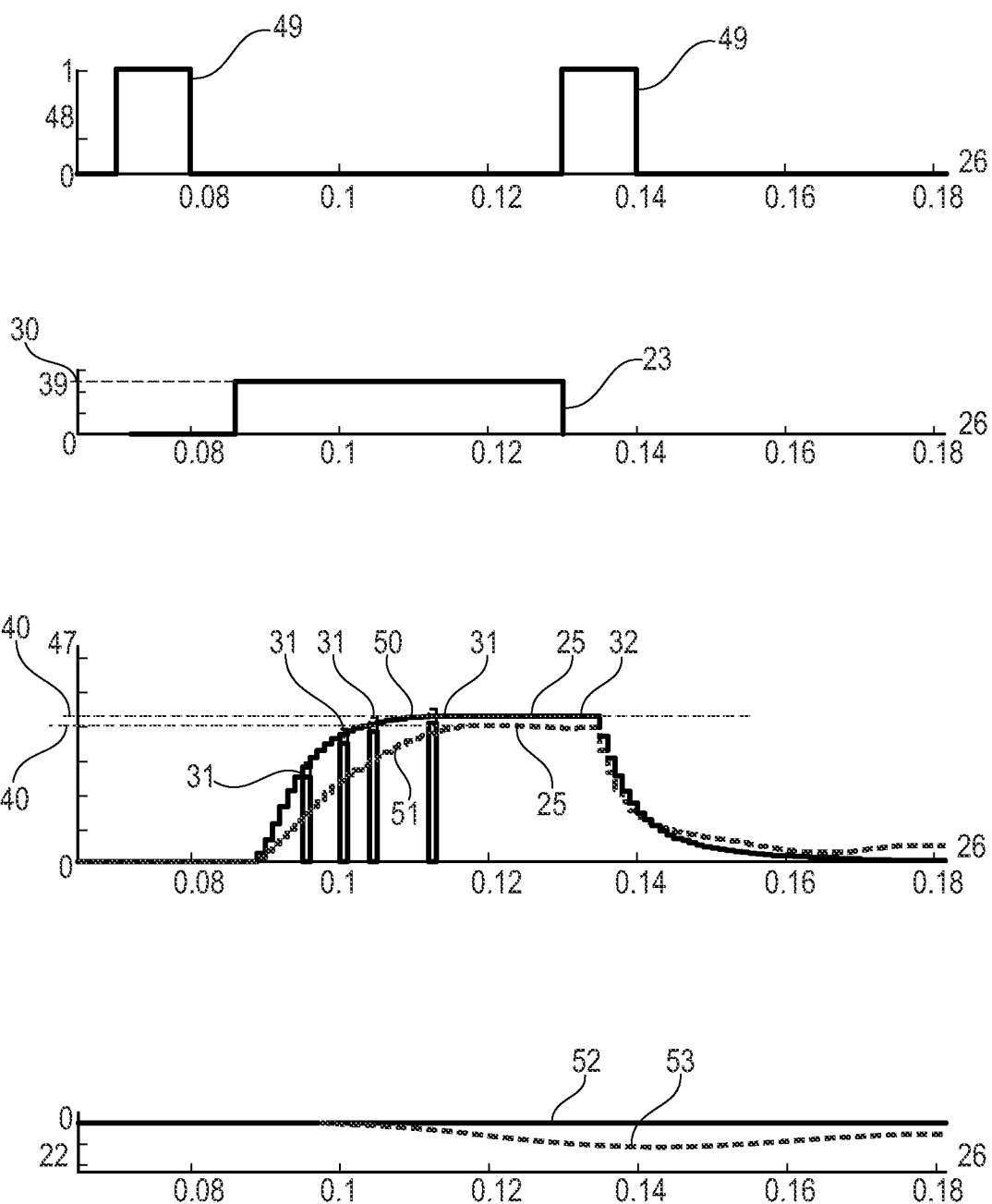
FIG. 7: a comparison of steps a) to d) of the method in a fault state and in an OK state of the drive arrangement.

FIG. 7 shows a comparison of steps a) to d) of the method in a fault state and in an OK state of the drive arrangement 1.

In the top diagram, a signal value 48 is plotted on the vertical axis and the time 26 is plotted on the horizontal axis. The described method is initiated via a first trigger signal 49. The method is ended via a second trigger signal 49, or the voltage signal 23 generated according to step b) ends.

In the second diagram from the top, the voltage 39 is plotted on the vertical axis and the time 26 is plotted on the horizontal axis. Initiated by the trigger signal 49, the method is started and, according to step a), the first position 22 of the magnetic poles 10, 11 is determined. According to step b) a voltage signal 23 with a first phase position 24 is generated. The voltage signal 23 has a constant voltage value 30 over a time 26.

In the third diagram from the top, the current 47 is plotted on the vertical axis and time 26 is plotted on the horizontal axis.

Due to the voltage signal 23 generated according to step b) and the voltage 39 thereby applied to the electric motor 2, the output current 21 of the electric circuit 3 rises. The time response as well as the stationary final value 40 of the output current 21 are determined here by the electrical time constant of the motor winding of the stator 9, i.e., by the resistance 41 and the inductance 42.

In the third diagram from the top, a first course 50 and a second course 51 of the rise of the current signals 25 of the output current 21 measured according to step c) are shown.

The first course 50 shows the rise and the final value 40 of a drive arrangement in a fault-free or OK state.

The second course 51 shows the rise and the final value 40 of a drive arrangement in a fault state.

Within the scope of steps c) and d), a stationary final value 40 of the current signal 25 resulting from the voltage signal 23, i.e. the current intensity, is determined or evaluated. The current signal 25, which is formed, for example, by superimposing the current signals 25 or output currents 21 measured at each first terminal 18, can be compared with a previously defined value stored in the control device 4. If the deviations from this value are within a defined tolerance field 31, it can be assumed that the entire process chain, consisting of the clocking transistors 27, 28 or half bridges 15, 16, 17 and their actuation, the connected motor 2 and the measurement of the current signals 25 via the current sensors 20, is functional (see first course 50).

In the second curve 51 it can be seen that the output current 21 or the current signal 25 rises more slowly than stored in the control device 4 (see first curve 50 or tolerance field 31). As already explained, this may be an indication of an incorrectly applied voltage 39 or an incorrectly generated voltage signal 23 or an incorrectly measured first position 22 of the permanent magnets or the magnetic poles 10, 11.

In the lower diagram, the first position 22 of the magnetic poles 10, 11 is plotted on the vertical axis and time 26 is plotted on the horizontal axis. Here, a third course 52 of the first position 22 corresponding to the first course 50 and a fourth course 53 of the first position 22 corresponding to the second course 51 are shown.

It can be seen from the third course 52 that by providing the voltage signal 23 and the generated current signal 25, there is no change in the first position 22. Thus, no torque is generated in the electric motor 2 when the method is carried out, since the phase angle of the resulting output current 21 corresponds to the first position 22 of the magnetic poles 10, 11, i.e., the phase angle of the permanent magnet flux.

From the fourth course 53, it can be seen that by providing the voltage signal 23 and the generated current signal 25, the first position 22 changes. During step d), this change in the first position 22, i.e. the position of the rotor 9, can be detected and evaluated.

The change in the first position 22 results, for example, from an incorrectly measured first position 22 of the permanent magnets or the magnetic poles 10, 11 in step a) or from the first phase position 24 of the voltage signal 23 generated according to step b) deviating from the first position 22.

Within the scope of the evaluation of the second course 51 and/or the fourth course 53, a fault state of the drive arrangement 1 can be concluded.

Figure 8:
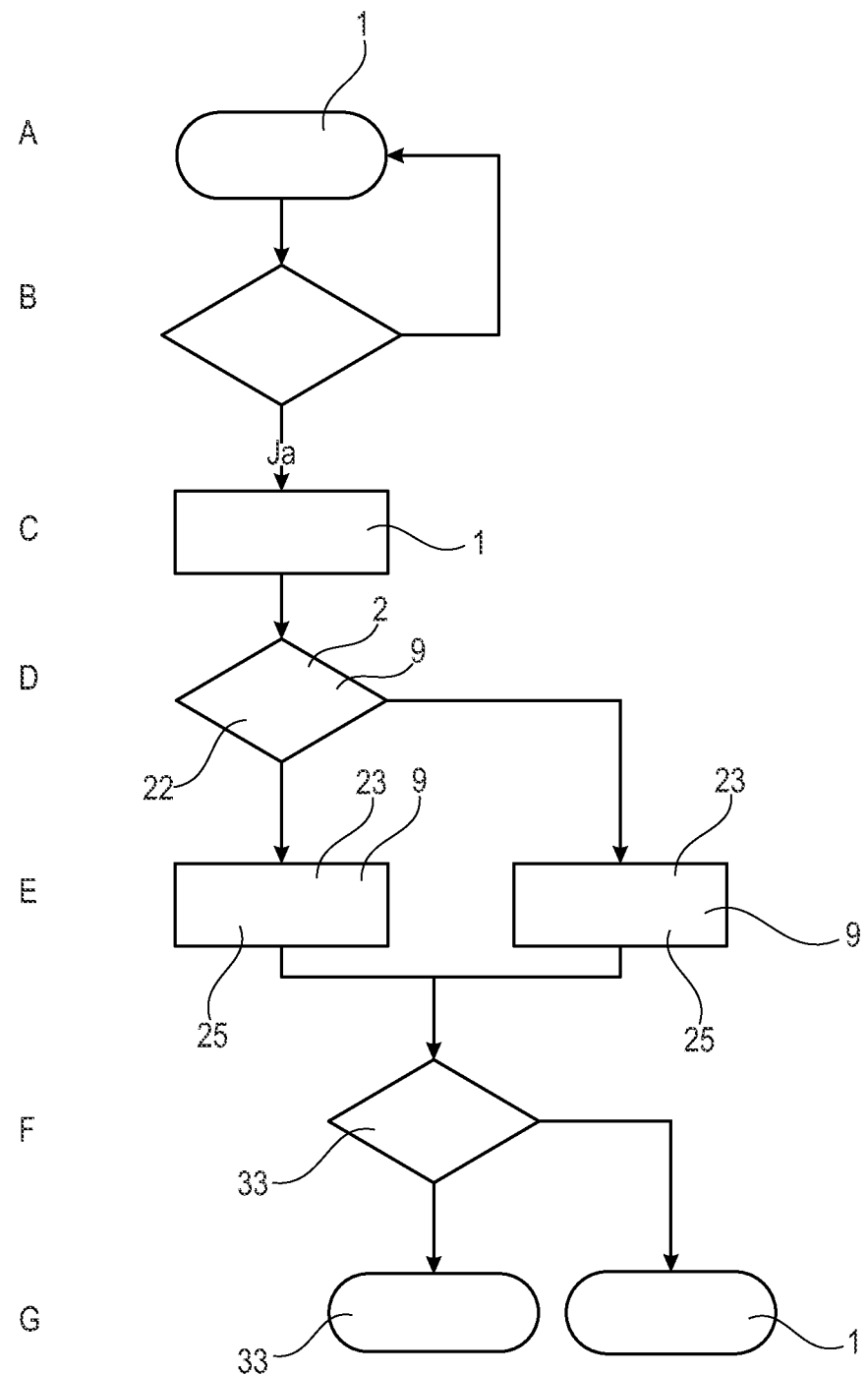
FIG. 8: a sequence of the method.
Figure 9:
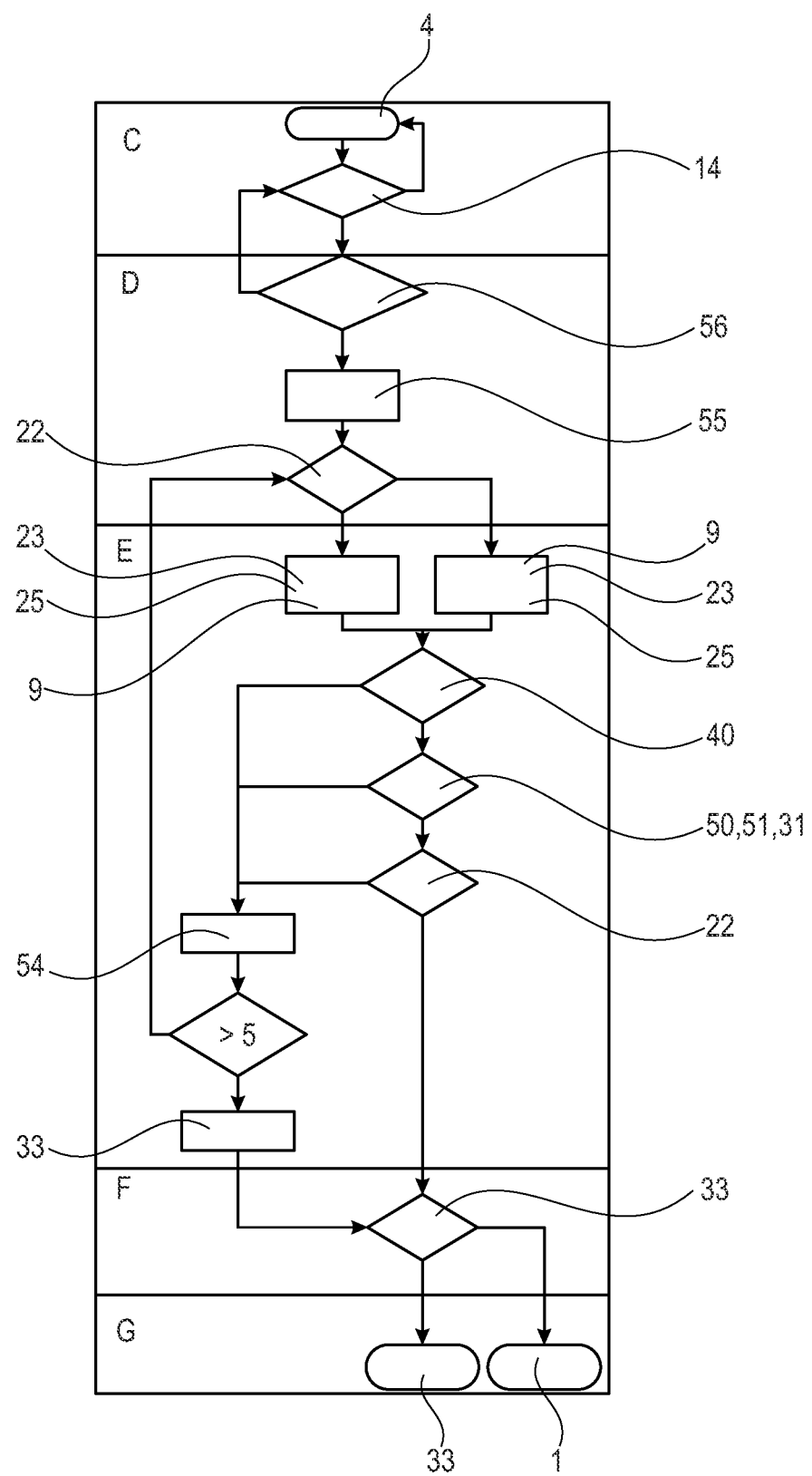
FIG. 9: a detailed sequence of the method.

FIG. 8 shows a sequence of the method. FIG. 9 shows a detailed sequence of the method. FIG. 8 shows positions A to G of the sequence. FIG. 9 shows with higher detail the positions C to G of the sequence. FIGS. 8 and 9 are described together below.

In position A, it is determined whether the drive arrangement 1 to be checked is switched off. In position B, it is determined whether there is a start signal for starting up the drive arrangement 1. If no start signal is present, the sequence provides for a return to position A. If a start signal is present, the drive arrangement 1 is started up in position C.

FIG. 9 shows that the first step is to check whether the control device 4 is ready for operation. If it is ready for operation, it is checked whether the DC voltage source 14 provides a sufficient DC link voltage. If this is not sufficient, it is checked again whether the control device 4 is ready for operation. If the DC link voltage is sufficient, the electric motor 2 is checked in position D to determine whether the rotor 9 is stationary.

For this purpose, for example, the selector lever position of a transmission shift and vehicle speed, i.e. parameters 56, can be checked. If this check is successful, the first position 22 of the magnetic poles 10, 11 can be determined by evaluating a position sensor 55. The determination of the first position 22 is used to check whether the rotor 9 is stationary.

If the rotor 9 is not stationary, the method is carried out with the rotor 9 rotating in the context of the following position E. For this purpose, no voltage signal is generated by the electric circuit 3 during steps b) to d), by which a torque is deliberately provided or generated, and instead only the voltage signal 23 generated during the method (which, where possible, should not generate a torque) is provided. Accordingly, a voltage signal 23 is to be generated of which the first phase position 24 is always identical to the first position 22, i.e. rotates with it.

If the rotor 9 is stationary, the method is carried out within the scope of position E with the rotor 9 stationary. For this purpose, a voltage signal 23 with a first phase 24 identical to the first position 22 is generated.

Within the scope of position E, the current signals 25 are measured and evaluated. First, it is checked whether the current signals 25 reach the final value 40 stored in the control device 4 or correspond to the reference current signals 32 stored in the control device 4 with regard to rise and final value 40. It is also checked whether the course 50, 51 of the current signal 25 or of the output current 21 lies within the tolerance field 31. It is also checked whether no torque is generated at the electric motor 2 by providing the voltage signal 23.

If one of these checks is negative, i.e., has not occurred, further diagnostics 54 are performed. If, for example, more than 5 repetitions of the additional diagnostics are necessary, it is decided that there is a fault in the drive arrangement 1. Otherwise, it is checked again whether the rotor 9 is stationary.

Within the scope of position F it is checked whether an error has been identified. If no error is present, the drive arrangement 1 can be released for the intended use, for example for the generation of a torque by the electric motor 2, according to position G. If a fault is identified, the drive arrangement 1 is transferred to a safe state within the scope of position G and disabled for the intended use. An error message 33 can be generated.

LIST OF REFERENCE SIGNS 1 drive arrangement
2 motor
3 electric circuit
4 control device
5 stator
6 first coil
7 second coil
8 third coil
9 rotor
10 first magnetic pole
11 second magnetic pole
12 first potential terminal
13 second potential terminal
14 DC voltage source
15 first half-bridge
16 second half-bridge
17 third half-bridge
18 first connection
19 second connection
20 current sensor
21 output current
22 first position
23 voltage signal
24 first phase position
25 current signal
26 time
27 upper transistor
28 lower transistor
29 contact point
30 voltage value
31 tolerance field
32 reference current signal
33 error message
34 drive train
35 motor actuator
36 motor monitoring unit
37 security logic
38 DC voltage capacitor
39 voltage
40 final value
41 resistance
42 inductance
43 first axis
44 second axis
45 third axis
46 fourth axis
47 current
48 signal value
49 trigger signal
50 first course
51 second course
52 third course
53 fourth course
54 diagnostics
55 position encoder
56 parameter

The invention claimed is:

1. A method for operating a drive arrangement that includes an electric motor, an electric circuit for operating the electric motor, and a control device for actuating the electric circuit; wherein the electric motor has at least a stator including at least three coils and a rotor including at least two magnetic poles; wherein the electric circuit has at least a first potential terminal and a second potential terminal, which are connectable to different potentials of a DC voltage source; wherein the electric circuit comprises three half-bridges between the potential terminals, wherein the coils are conductively connected to one half-bridge each via a first terminal in each case and to the other coils via a second terminal in each case; wherein the electric circuit has at least three current sensors for measuring an output current conducted via the corresponding first terminal; the method comprising:
- a) determining a rotational first position of the magnetic poles of the rotor with respect to the stator by the control device;
- b) generating a voltage signal by the electric circuit, wherein the voltage signal has only a first phase position identical to the first position;
- c) measuring current signals of the output current generated by the voltage signal through the current sensors; and
- d) evaluating the current signals by the control device with regard to a rise in the current signals over a period of time and evaluating the state of the drive arrangement, wherein, where the current signals evaluated according to step d) are within a tolerance field with respect to a reference current signal stored in the control device, a release is generated for operating the electric motor and for generating a torque; and wherein, where the current signals are outside the tolerance field, an error message is generated by the control device.

2. The method of claim 1, wherein, in step d), the current signals are evaluated by the control device at least with regard to a rise in the current signals over a period of time or with regard to a value of the current signal reached after a period of time.

3. The method of claim 1,
wherein each half-bridge has at least one upper transistor and one lower transistor which are electrically conductively connected to one another;
wherein the upper transistor is electrically conductively connected to the first potential terminal and the lower transistor is electrically conductively connected to the second potential terminal; and
wherein each half bridge has a contact point between the upper transistor and the lower transistor, via which contact points in each case the first terminal is connected to the corresponding half bridge; wherein, to generate the voltage signal according to step b), a pulse pattern is selected in which all transistors clock.

4. The method of claim 1, wherein the voltage signal has a constant voltage value.

5. The method of claim 1, wherein the rotor has a constant first position at least during step a); wherein, during step d), a change in the position of the rotor is detected and evaluated.

6. The method of claim 1, wherein the rotor rotates relative to the stator at least during steps a), b) and c).

7. The method of claim 1, wherein the method is initiated when at least one of the following conditions exists:
- i. a restart of the drive arrangement;
- ii. the rotor is stationary relative to the stator; or
- iii. the rotor rotates torque-free relative to the stator.

8. A drive arrangement, comprising:
an electric motor that has at least a stator including at least three coils and a rotor including at least two magnetic poles;
an electric circuit for operating the electric motor, wherein the electric circuit has at least a first potential terminal and a second potential terminal, which are connectable to different potentials of a DC voltage source, wherein the electric circuit comprises three half-bridges between the potential terminals, wherein the coils are conductively connected to one half-bridge each via a first terminal in each case and to the other coils via a second terminal in each case, wherein the electric circuit has at least three current sensors for measuring an output current conducted via the corresponding first terminal; and
a control device for actuating the electric circuit by executing steps including:
- a) determining a rotational first position of the magnetic poles of the rotor with respect to the stator by the control device;
- b) generating a voltage signal by the electric circuit, wherein the voltage signal has only a first phase position identical to the first position;
- c) measuring current signals of the output current generated by the voltage signal through the current sensors; and
- d) evaluating the current signals by the control device with regard to a rise in the current signals over a period of time and evaluating the state of the drive arrangement, wherein, where the current signals evaluated according to step d) are within a tolerance field with respect to a reference current signal stored in the control device, a release is generated for operating the electric motor and for generating a torque; and wherein, where the current signals are outside the tolerance field, an error message is generated by the control device.

9. The drive arrangement of claim 8, wherein, in step d), the current signals are evaluated by the control device at least with regard to a rise in the current signals over a period of time or with regard to a value of the current signal reached after a period of time.

10. The drive arrangement of claim 8,
wherein each half-bridge has at least one upper transistor and one lower transistor which are electrically conductively connected to one another;
wherein the upper transistor is electrically conductively connected to the first potential terminal and the lower transistor is electrically conductively connected to the second potential terminal; and
wherein each half bridge has a contact point between the upper transistor and the lower transistor, via which contact points in each case the first terminal is connected to the corresponding half bridge; wherein, to generate the voltage signal according to step b), a pulse pattern is selected in which all transistors clock.

11. The drive arrangement of claim 8, wherein the voltage signal has a constant voltage value.

12. The drive arrangement of claim 8, wherein the rotor has a constant first position at least during step a); wherein, during step d), a change in the position of the rotor is detected and evaluated.

13. The drive arrangement of claim 8, wherein the rotor rotates relative to the stator at least during steps a), b) and c).

14. The drive arrangement of claim 8, wherein executing the steps is initiated when at least one of the following conditions exists:
   i. a restart of the drive arrangement;
   ii. the rotor is stationary relative to the stator; or
   iii. the rotor rotates torque-free relative to the stator.

* * * * *